Figure 1:
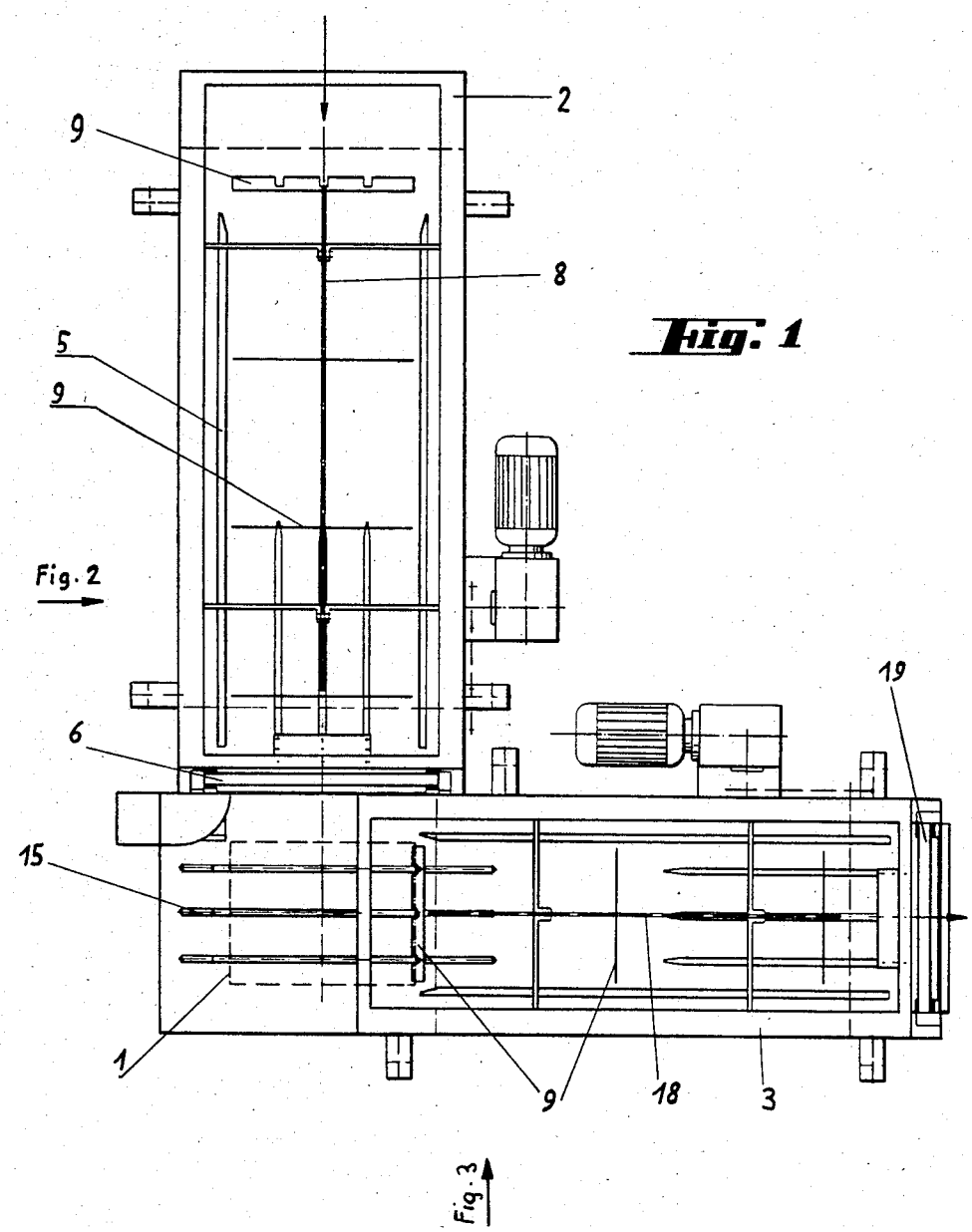

United States Patent [19]

Haas, Sr. et al.

[11] Patent Number: 4,579,030

[45] Date of Patent: Apr. 1, 1986

[54] CUTTER FOR BLOCKS OF WAFERS

[76] Inventors: Franz Haas, Sr., Gerstlgasse 25, Wien, Austria, 1210; Franz Haas, Jr., Castellezgasse 32, Wien, Austria, 1020; Johann Haas, Wiener Strasse 209-215, Spillern (NÖ), Austria, 2104

[21] Appl. No.: 379,355

[22] Filed: May 18, 1982

Related U.S. Application Data

[63] Continuation of Ser. No. 139,030, Apr. 10, 1980, Pat. No. 4,359,920.

[30] Foreign Application Priority Data

Apr. 12, 1979 [AT] Austria .................................. 2773/79

[51] Int. Cl.⁴ .......................... B26D 1/50; B26D 7/06
[52] U.S. Cl. ...................................... 83/404.2; 83/423
[58] Field of Search ................. 83/404.1, 404.2, 404.3, 83/423, 278

[56] References Cited

U.S. PATENT DOCUMENTS

| | | | |
|---|---|---|---|
| 1,330,154 | 2/1920 | Alchin | 83/423 X |
| 2,085,110 | 6/1937 | Luther | 83/423 |
| 2,094,718 | 10/1937 | Pentzlin | 83/404.2 |
| 2,811,997 | 11/1957 | Schmidt et al. | 83/404.1 X |
| 3,068,915 | 12/1962 | Arnett | 83/404.2 X |
| 3,275,118 | 9/1966 | McCain et al. | 83/423 X |
| 3,491,807 | 1/1970 | Underwood | 83/423 X |
| 3,884,102 | 5/1975 | Faltin | 83/404.2 X |
| 3,890,864 | 6/1975 | Kobayashi et al. | 83/423 X |

Primary Examiner—Frank T. Yost
Attorney, Agent, or Firm—Schwartz, Jeffery, Schwaab, Mack, Blumenthal & Evans

[57] ABSTRACT

The apparatus comprises one or more cutting members arranged along a plane of transport for the wafer blocks. The transporting of the wafer blocks is accomplished by one or more endless revolving members carrying a plurality of pressure components. The endless revolving transport members may be mounted either above or below the plane of transport and extend into the plane of transport during movement of the wafer blocks toward and away from the cutting member or members.

1 Claim, 7 Drawing Figures

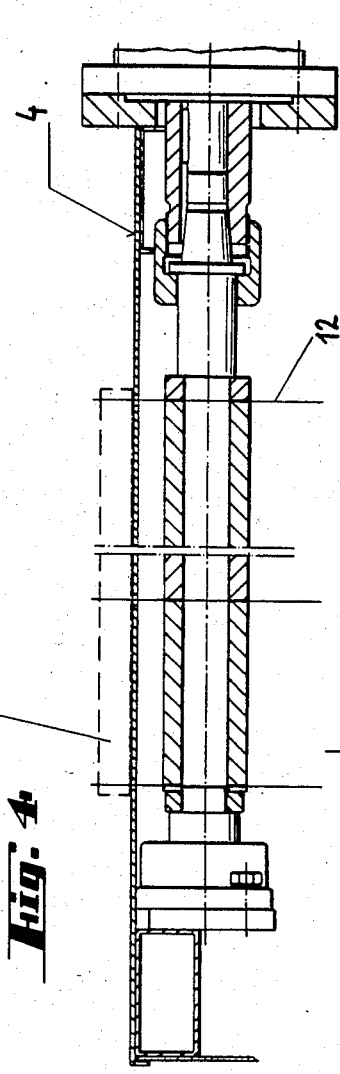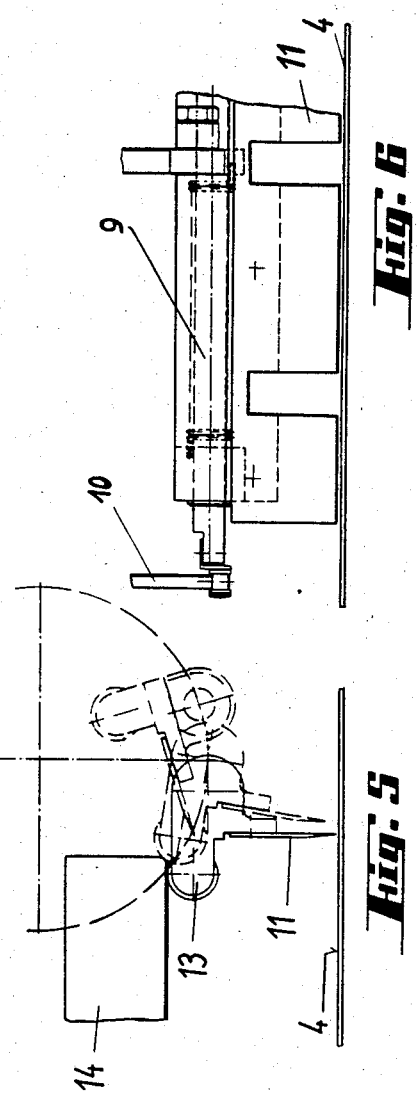

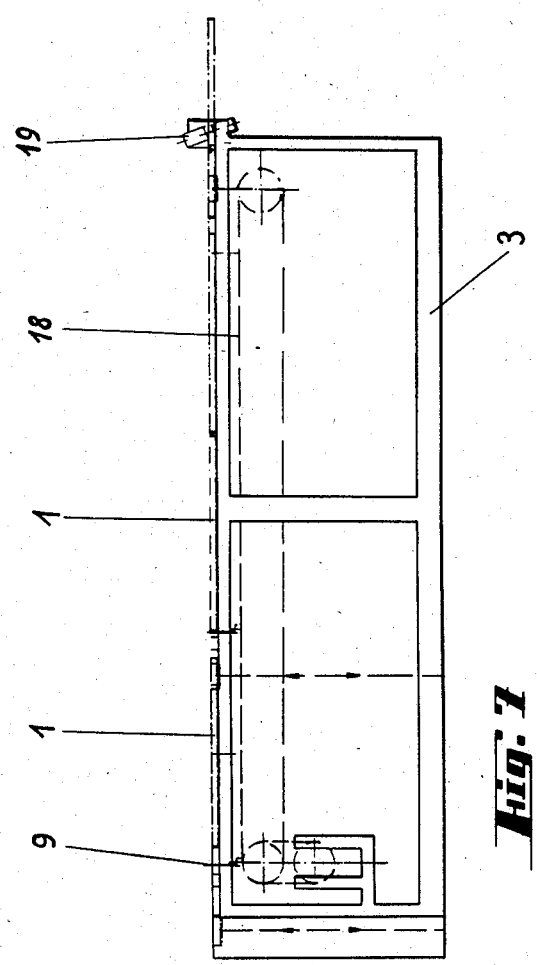

CUTTER FOR BLOCKS OF WAFERS

This is a continuation of application Ser. No. 139,030, filed Apr. 10, 1980, now U.S. Pat. No. 4,359,920.

The invention concerns an apparatus for the cutting of blocks of wafer (books of wafer) with at least one cutting device to which a block of wafers or a plurality of blocks of wafers placed on top of each other are supplied by a pressure component.

It is the purpose of the device for the cutting of blocks of wafers to divide the block into individual cuts. This is effected in most cases by passing the block of wafers in two mutually perpendicular axes through a cutting device each. The cutting devices may consist both of a plurality of saw blades arranged adjacent to each other or of vertically tensioned, thin cutting wires or bands, acting as knives. The blocks of wafers are supplied to the cutting devices by pressure components which guide the wafer block between the saw blades or cutting wires. In the known devices for the cutting of wafer blocks the pressure component must be returned over the identical path over which it has been guiding the block of wafers to the cutting device. This signifies that the pressure component is moved back and forth and must be reversed in its two terminal positions. The efficiency of such known devices for the cutting of blocks of wafers is therefore limited by kinematic conditions.

Attempts have been made to circumvent the limiting conditions of the performance of known devices by stacking a number of blocks of wafers over each other and to pass the stack as a unit through the cutting device.

Usually, the blocks of wafers supplied by several wafer production lines are combined and guided into a a device for the cutting of wafer blocks. The primary reason for this is to obtain the number of slices required to fully utilizes slice packing machine. However, the fully automatic combination of the output of two devices for the cutting of blocks of wafers is highly difficult and susceptible to failure, in view of the large number and the small size of the individual slices.

In the high performance installation for the production of slices recently developed the number of blocks (books) of wafers supplied per minute is high enough so that even when the blocks of wafers are stacked over each other for the cutting operation, the capacity of the devices is exceeded and the blocks of wafers supplied by one wafer production line must be distributed over two or more cutting devices.

Another reason why the known cutting devices are no longer adequate for the processing of the blocks supplied by one production line is that in the case of dipped slices only one block of wafer may be cut at a time becuase the block is passed to a distributor device after the cutting operation and the separation of two cut blocks of wafers placed on top of each other is technically very difficult. If, however, only one block may be cut at a time, then the velocity at which the pressure component must be moved back and forth in order to process the wafer blocks supplied by one production line will be of a magnitude so that it may lead to damage to the blocks of wafer on the one hand and to a reduction of the life of the apparatus on the other.

It is, therefore, the object of the present invention to provide a device for the cutting of blocks of wafers capable of processing individually in succession supplied even by several wafer block production lines, without damage to the blocks or slices and without affecting the life of the apparatus as the result of excessive working velocities.

This is accomplished beginning with a device of the above-mentioned type according to the invention by that above or below the plane of transport of the block or blocks of wafers an endless, revolving means of transport equipped with a plurality of work drivers in the form of pressure components is arranged, wherein the distance between two work drivers following each other in the direction of the transport is larger than the width or length, respectively of the blocks of wafers to be cut.

This arrangement eliminates the back and forth motion of the work drivers so that an intermittent forward movement of the means of transportation is sufficient, wherein the stoppage of the transportation means must last until the next block of wafers is inserted into the means of transportation by a conveyor or an auxiliary transporter.

Another characteristic of the invention provides in an apparatus for the cutting of blocks of wafers with two cutting devices following each other in the direction of the transport of the blocks of wafers and including an angle of 90° with their cutting planes, a means of transportation arranged after the first cutting device and transversely to the transport direction of the endless, revolving transport device located in front of the first cutting device.

If no auxiliary transporter is provided for the insertion of the blocks of wafers in the means of transportation, it is necessary to coordinate the intermittent movements of the two means of transportation in order to prevant damage to the blocks of wafers coming from the first cutting frame by the work drivers of the second block of wafers.

The invention is further characterized by that the means of transportation comprises an auxiliary transporter arranged transversely to the first cutting device and a means of transportation arranged in front of the second cutting device, connecting with the auxiliary transporter in succession and located above or below the plane of transportation of the blocks of wafers, said means of transportation being endless, revolving and equipped with a plurality of work drivers in the form of pressure components, where the distance of two work drivers following each other in the direction of transport is larger than the length or width, respectively, of the blocks of wafers to be cut.

The arrangement of an auxiliary transporter before the second means of transport makes it possible to determine the velocity of the second means of transport merely on the basis to obtain a particularly gentle cutting process. The auxiliary transporter on the other hand, inserts the wafer block at a higher (for example 2-3 times higher) velocity into the area of the second means of transportation, so that space is provided at a rapid rate for the next block of wafers behind the first cutting device.

Figure 2:
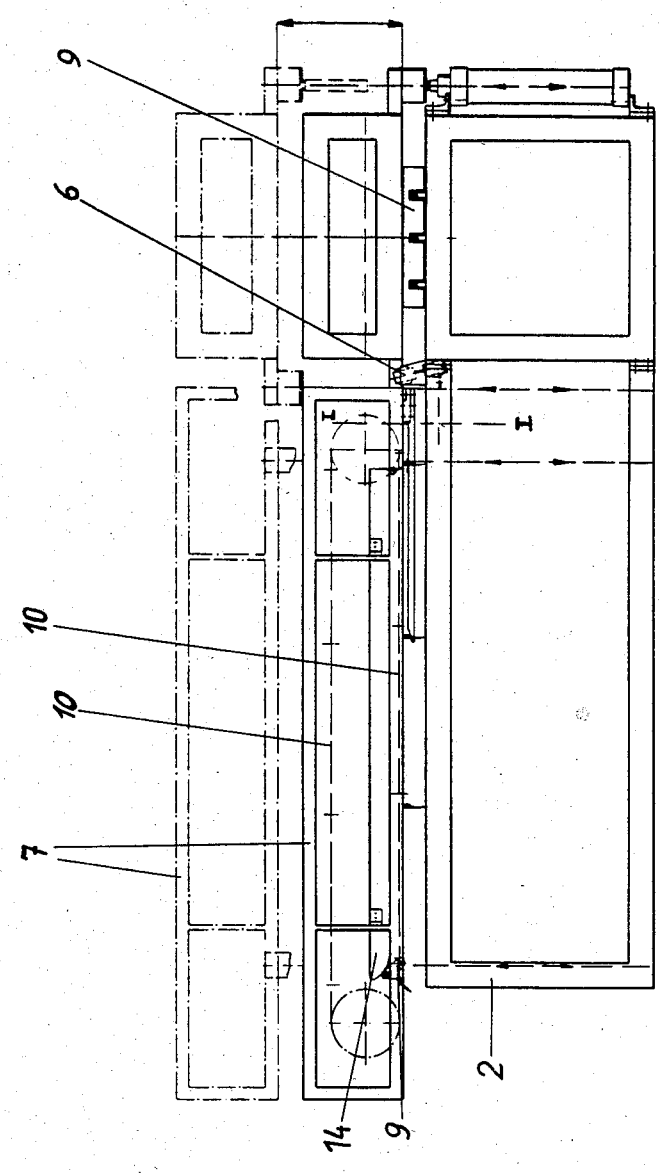
Figure 3:
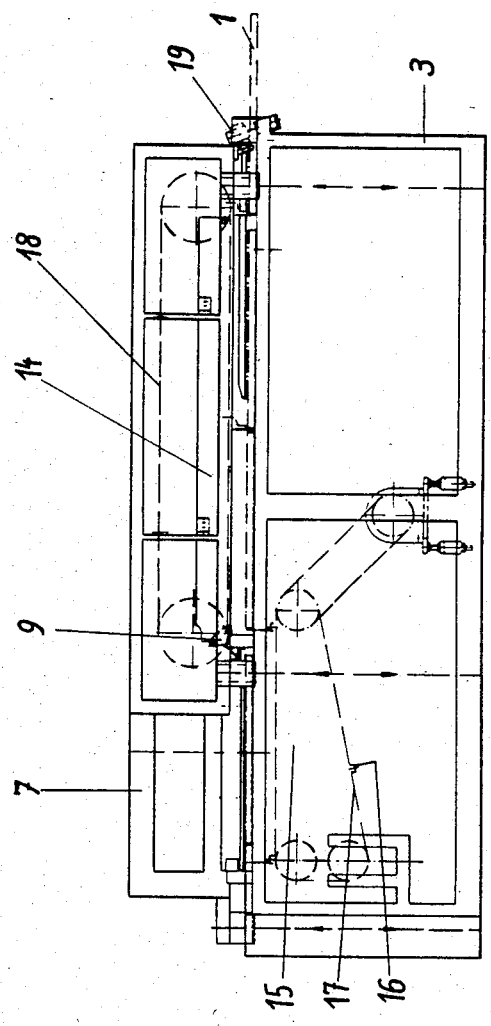

The invention will be explained in more detail with the aid of examples of embodiment and with reference to the drawings. In the drawings, FIG. 1 shows a top view of an example of embodiment of the invention;

FIG. 2 a front elevation of the device according to FIG. 1;

FIG. 3 a side elevation of the device according to FIG. 1;

FIG. 4 a section on the line I—I of FIG. 2;

FIG. 5 a side elevation of a detail of the means of transportation;

FIG. 6 a front elevation of a work driver and

FIG. 7 a view of another example of embodiment of the means of transportation.

According to an example of embodiment an apparatus for the cutting of wafer blocks 1 consists of two elongated frames 2 and 3, with the top sides of frames 2 and 3 forming a plane of transport 4 for the blocks of wafers 1.

The two frames 2, 3 are arranged at right angles to each other and carry on their upper sides guides 5 for the wafer blocks 1. On the front side of the first frame 2 a cutting device 6 is provided at the height of the plane of transport 4 of the wafer blocks 1. A rack 7 is arranged above the first frame 2, carrying an endless, revolving means of transport 8. This consists of an endless chain drive (belt drive) arranged parallel to the direction of transport of the wafer block 1 and carrying work drivers 9 in the form of pressure components for the wafer blocks 1; the side of said chain drive facing the plane of transport being parallel to said plane of transport 4. The rack 7 of the means of transport 8 is arranged adjustably and perpendicularly to the plane of transport 4, in order to make possible the adjustment of the distance of the side of the chain drive facing the plane of transport 4 to said plane of transport 4 as a function of the height of the wafer blocks 1 or wafer books, while simultaneously changing the work drivers. This may be effected, for example, by means of hydraulic cylinders or the like. Conveniently, the rack 7 of the means of transport 8 may be mounted rotatingly in the upward direction from the plane of transport 4 to facilitate access to the plane of transport 4, for example, for cleaning purposes.

The work drivers 9 are attached to the two means of transport 8 in a swivelling manner, wherein the distance between successive work drivers 9 is larger than the length or width, respectively, of the wafer blocks to be cut. Each work driver 9 has a knife-like part 11 in the form of a pressure component, extending transversely to the direction of transport and provided with slits open in the downward direction, in order to permit the passage of the saw blades 12 arranged under the plane of transport 12.

Each work driver 9 further has a nose 13, arranged eccentrically with respect to its swivelling axis and capable of being placed in contact with a ledge 14 fastened to the rack 7 of the means of transport 8. The ledge 14 is parallel to the plane of transport 4 of the blocks of wafer 1 and is located above the side of the chain drive facing the plane of transport 4. Each work driver is equipped with a spring, which maintains it in its rest position, wherein its knife-like part 11, when the work driver 9 is located at the side of the chain drive facing the plane of transport 4 is rotated against the direction of transport, as long as the nose 13 is not engaging the ledge. As soon as the work driver 9 contacts the cam-like onset of the ledge 14 with its nose 13 and slides along it, the work drive 9 is swivelled into its working position against the force of the spring, so that the knife-like part 11 approaches the rear face of a block of wafers without damaging the edges of the block of wafers and the knife-like part 11 includes in its working position a right angle with the plane of transport 4, while the work driver 9 is resting against the ledge 14 by means of its nose 13.

Another reason why the work drivers are designed in the form of a knife is that they are thus readily able to cut through blocks of wafers that may be poorly constructed or are placed in front of the work driver in a faulty position. This prevents damage to the means of transport.

The second rack 3 follows transversely the face of the first rack 2 equipped with the first cutting device 6. The rack 3 carries an auxiliary transporter 15, arranged below the plane of transport 4 and consisting of several parallel chain drivers 17 equipped with fingers 16. The fingers 16 are arranged in rows transversely to the direction of transport and extend through the slits provided in the bottom of the plane of transport 4 into the area of the wafer blocks 1. Following the auxiliary transporter 15, a second endless, revolving means of transport 18 is arranged above the second rack 3, which guides the block of wafers already cut in one direction, into a second cutting device 19. The second means of transportation 18 is identical in its configuration with the first means of transportation, but the distances between successive work drivers 9 are larger than the widths or lengths, respectively of the wafer blocks 1. The auxiliary transporter 15 urges the wafer block 1, already cut in one direction, into a position behind the first work driver of the second means of transport.

This makes it possible to cut the wafer block first longitudinally or transversely.

In a further form of embodiment of the invention, the transporting device guiding the wafer blocks already cut in one direction to the second cutting device 19 consists of a single, endless revolving means of transport, which grips the wafer blocks coming from the first cutting device 6, as soon as they are urged by the blocks of wafers following them into the range of the work drivers of the means of transport.

It is necessary in the process to coordinate the movements of the two means of transportation with each other, in order to prevent damage to the wafer blocks coming from the first cutting frame by the work drivers of the second means of transportation. A further example of embodiment provides that the endless, revolving means of transport guiding the blocks of wafer to be cut to the first and the second, respectively, cutting device, are arranged below the plane of transport 4. The cutting devices may consist of cutting frames equipped with wires or steel bands or they may be in the shape of rotating saw blades penetrating through the plane of transport 4 with their axes of rotation being arranged above or below the plane of transport 4.

When cutting devices are used wherein the cutting frame is equipped with wires or steel bands, the wafer block will not be pressured completely through the cutting frame by the work drivers 9. This is accomplished by the next block of wafers.

We claim:

1. An apparatus for cutting blocks of wafers comprising:

at least one first cutting member;

first means for transporting blocks of wafers to said first cutting member, said first transport means including a first endless revolving member disposed above the plane of transport of said wafers;

first means for applying pressure to said blocks of wafers in the direction of transport, said first pressure means comprising a plurality of first pressure components mounted on said endless revolving member and extending downwardly therefrom, wherein the distance between two consecutive first pressure components following each other in the direction of transport is greater than the width or length of the blocks of wafers to be cut;

a second cutting member having a cutting plane arranged at an angle of 90° to said first cutting member;

a second means for transporting blocks of wafers, said second transport means arranged to transport said blocks of wafers from the first cutting member to the second cutting member; said second transport means comprising a second endless revolving member disposed above the plane of transport of said wafers and having second means for applying pressure to said blocks of wafers, said second pressure applying means comprising a plurality of second pressure components extending downwardly from said second endless revolving member; and a rack member mounting said first transport means wherein said rack member is mounted to swing about a horizontal axis for causing said first pressure components to move into and out of said plane of transport.

* * * * *